(No Model.)
C. A. POLSON.
INSECT GUARD FOR POULTRY PERCHES.
No. 590,237. Patented Sept. 21, 1897.
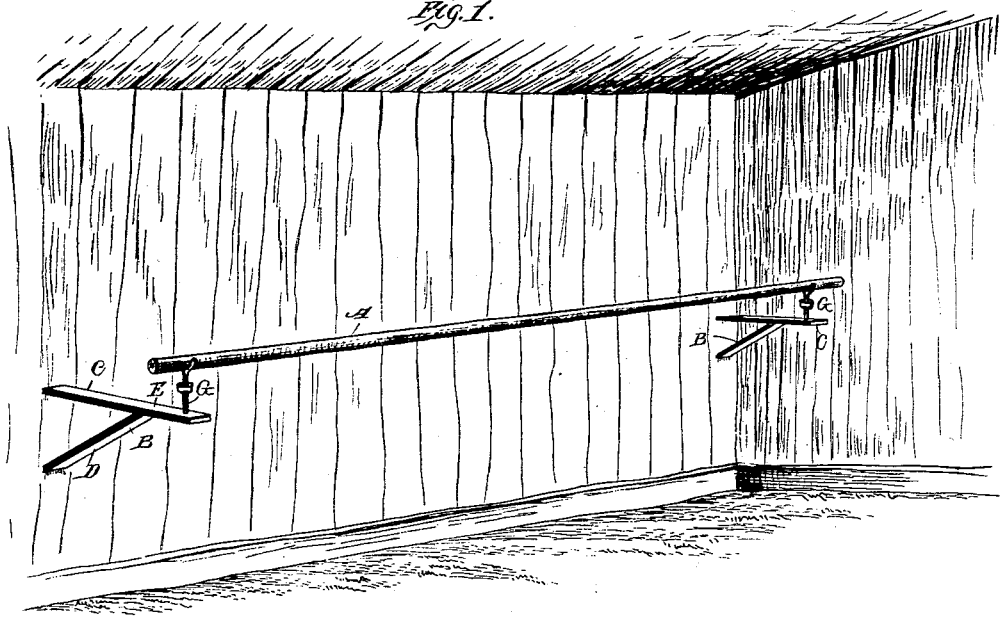
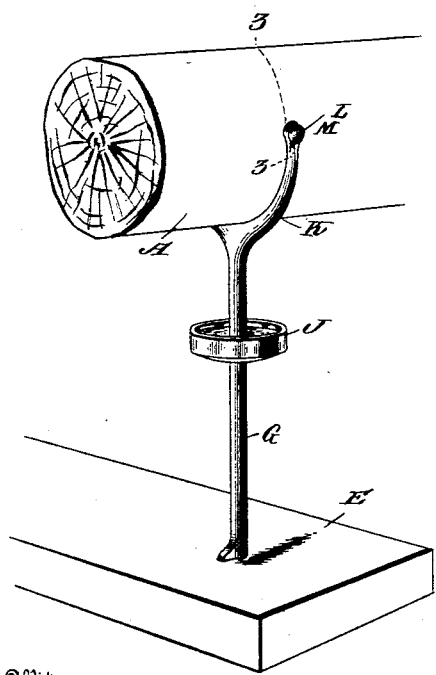
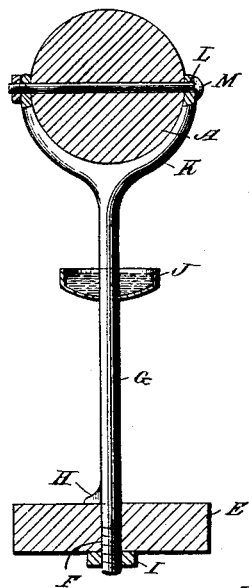
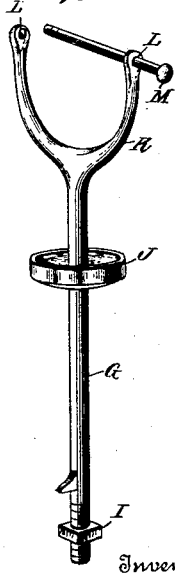
Witnesses
W. C. Lunsford
Chas E. Brock
Inventor
Cora A. Polson,
by O'Meara
Attorneys

UNITED STATES PATENT OFFICE.

CORA A. POLSON, OF WINKLER'S MILLS, KANSAS.

INSECT-GUARD FOR POULTRY-PERCHES.

SPECIFICATION forming part of Letters Patent No. 590,237, dated September 21, 1897.

Application filed March 13, 1897. Serial No. 627,311. (No model.)

*To all whom it may concern:*

Be it known that I, CORA A. POLSON, residing at Winkler's Mills, in the county of Riley and State of Kansas, have invented a new and useful Insect-Guard for Poultry-Perches, of which the following is a specification.

My invention relates to certain improvements in devices for protecting poultry from parasites.

The object of the invention is to provide suitable means, secured to a roost, whereby the poultry or fowls are protected from any possibility of mites or lice reaching them while they are roosting.

A further object of the invention is to provide suitable securing brackets and hangers, so that the roost can be securely held in place.

A further object of the invention is to provide a support for the roost secured to a bracket and having a chamber located a short distance below said roost adapted to contain oil or fluid of a poisonous nature.

With these ends in view my invention consists in the peculiar construction of the various parts and in their novel combination or arrangement, all of which will be fully described hereinafter and particularly pointed out in the claims.

In the drawings forming a part of this specification, Figure 1 illustrates a perspective view of a coop or other compartment provided with the brackets to which the roost is secured. Fig. 2 is a perspective view showing the lower portion of the bracket, the liquid-receiving chamber, and the forked arm carrying the roost. Fig. 3 is a cross-sectional view on the line 3 3 of Fig. 2. Fig. 4 is a perspective view of the device for carrying the roost, the same being removed from the bracket.

In carrying out my invention I have shown a coop or other compartment A, having secured thereto brackets B, the same being constructed in any suitable manner, preferably being composed of the upper section C, secured to the lower portion or leg D.

E indicates the base of the bracket. This base is provided with the vertical opening F to receive the screw-threaded end of a bar G. H indicates a teat or projection on one side of the bar G, the same being adapted to bear against the upper portion of the base of the bracket, an end I on the lower portion of the screw-threaded end of the bar G being utilized to securely hold the lower portion of the bar within the base of the bracket.

J represents a chamber preferably circular in shape and adapted to contain oil or liquid of a poisonous nature. This chamber is secured to the bar or standard and is preferably integral with the bar G a short distance above the base of the bracket. It should be noticed that the bar G extends through the central portion of this chamber and has at its upper end the forked or outwardly-extending arms K, provided in their upper part with the openings L for the reception of a bolt or locking-key M, which is adapted to pass through the side openings L and the roost and be secured at its opposite end, so that the roost will be securely held in place.

From the foregoing description it will be seen that I provide against any possibility of mites or insects of any kind reaching the roost upon which the fowl or poultry are roosted. Should any of these insects endeavor to reach the poultry, they would naturally have to do so by starting from the lower portion of the bracket and up the bar G. Upon reaching the chamber J, containing the oil or poisonous liquid, their progress will be retarded and they will not be enabled to reach the roost.

I do not care to limit myself to the peculiar shape of standard carrying the forked arms nor to the exact construction of the liquid-chamber, as slight changes might be made in the formation thereof.

The invention is very simple in construction and composed of a minimum number of parts, and by its use I provide a device whereby poultry can always be kept in a healthy condition.

Having thus described my invention, what I claim as new, and desire to secure by Letters Patent, is—

1. A device for protecting poultry from parasites, consisting of the bracket or base, a bar or standard secured therein and carrying a chamber for the reception of oil or the like and having at its upper end the outwardly-branching or forked arms to receive a roost, and a bolt or locking-pin passing through said arms and the roost, for the purpose set forth.

2. The herein-described device for protecting poultry from parasites, consisting of a bracket or base, a bar or standard secured therein, and provided with a teat or projection H, and the lower screw-threaded portion F, to enter said base, a nut to secure said base or bracket against the teat or projection, the standard or bar being provided with the chamber for the reception of the liquid, the upper portion of said bar having the forked arms to receive the roost, and a bolt extending through the upper portion of said forked arms and roost for the purpose set forth.

3. The combination with a wall of a coop or other compartment, of a bracket secured thereto, an upwardly-extending bar or standard having the screw-threaded lower end secured within said bracket, and a teat or projection upon the bar above the same, a chamber surrounding a portion of the standard as shown, the standard being provided at its upper portion with the outwardly and upwardly extending forked arms, the roost resting in the fork, and a bolt passing through said forks and the roost for the purpose set forth.

<div style="text-align: right;">CORA A. POLSON.</div>

Witnesses:
   LOUIS NIEHENKE,
   GEO. J. POLSON.